(12) United States Patent
Kawamura et al.

(10) Patent No.: US 11,208,143 B2
(45) Date of Patent: Dec. 28, 2021

(54) CONTROL DEVICE FOR STEERING MECHANISM

(71) Applicant: JTEKT CORPORATION, Osaka (JP)

(72) Inventors: Hiroshi Kawamura, Okazaki (JP); Yuji Fujita, Okazaki (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 16/722,078

(22) Filed: Dec. 20, 2019

(65) Prior Publication Data

US 2020/0198696 A1 Jun. 25, 2020

(30) Foreign Application Priority Data

Dec. 25, 2018 (JP) .............................. JP2018-241160

(51) Int. Cl.
*B62D 5/04* (2006.01)

(52) U.S. Cl.
CPC .................. *B62D 5/0463* (2013.01)

(58) Field of Classification Search
CPC .. B62D 5/0463; B62D 5/0406; B62D 5/0481; B62D 5/0493; B62D 5/046; H02P 29/028; H02P 25/22; H02P 6/28
See application file for complete search history.

(56) References Cited

U.S. PATENT DOCUMENTS

| 2016/0094175 | A1 | 3/2016 | Yamasaki |
| 2016/0139638 | A1* | 5/2016 | Kim .......................... G06F 1/20 |
| | | | 700/300 |
| 2020/0023887 | A1 | 1/2020 | Sasaki et al. |
| 2020/0076343 | A1* | 3/2020 | Zhang ...................... H02P 5/46 |

FOREIGN PATENT DOCUMENTS

| CN | 205899270 U | * | 1/2017 |
| DE | 102015218663 A1 | | 3/2016 |
| EP | 2450259 A1 | | 5/2012 |

(Continued)

OTHER PUBLICATIONS

N. Scheinberg, "High-speed GaAs operational amplifier," in IEEE Journal of Solid-State Circuits, vol. 22, No. 4, pp. 522-527, Aug. 1987, doi: 10.1109/JSSC.1987.1052766 (Year 1987).*

(Continued)

*Primary Examiner* — James J Lee
*Assistant Examiner* — Shon G Foley
(74) *Attorney, Agent, or Firm* — Oliff PLC

(57) ABSTRACT

In a control device for a steering mechanism, the steering mechanism includes a motor that includes a plurality of coils. The plurality of coils include a first coil and a second coil. The control device includes a first control system and a second control system configured to compute a command value for torque of the motor to be applied to the steering mechanism. The first control system and the second control system are each configured to control power supply to the plurality of coils of the motor based on the command value. The first control system includes a first microcomputer that has first characteristics, and the second control system includes a second microcomputer that has second characteristics that are different from the first characteristics.

4 Claims, 4 Drawing Sheets

(56) References Cited

FOREIGN PATENT DOCUMENTS

JP        2011-195089 A     10/2011
WO    2018/051550 A1    3/2018

OTHER PUBLICATIONS

Preckshot, G. G. and U.S. Nuclear Regulatory Commission. Division of Reactor Controls and Human Factors, and Lawrence Livermore National Laboratory. Method for performing diversity and defense-in-depth analyses of reactor protection systems [microform] (Year: 1994).*

May 18, 2020 Search Report issued in European Patent Application No. 19218475.2.

\* cited by examiner

CONTROL DEVICE FOR STEERING MECHANISM

INCORPORATION BY REFERENCE

The disclosure of Japanese Patent Application No. 2018-241160 filed on Dec. 25, 2018 including the specification, drawings and abstract is incorporated herein by reference in its entirety.

BACKGROUND

1. Technical Field

The present disclosure relates to a control device for a steering mechanism.

2. Description of Related Art

There is known a steering device that assists a driver in performing a steering operation by applying a drive force of a motor to a steering mechanism of a vehicle. Such a steering device incorporates an electronic control unit (ECU) that controls operation of the motor. For example, Japanese Unexamined Patent Application Publication No. 2011-195089 (JP 2011-195089 A) describes a device in which an ECU is formed with a plurality of control systems that each include a motor, a microcomputer that controls drive of the motor, and a drive circuit that controls power supply to a plurality of coils of the motor. In this case, the respective microcomputers of the control systems control power supply to the plurality of coils independently by controlling the respective drive circuits corresponding to the control systems.

SUMMARY

In the case where power is supplied to the coils in the same manner in the control systems, a control load is imposed on respective constituent elements of the control systems such as the microcomputers and the drive circuits corresponding to the control systems in the same manner. For example, if the respective constituent elements of the control systems have the same configuration, an abnormality due to the same factor may be caused in the respective constituent elements of the control systems. In this case, the abnormality may be caused simultaneously in the constituent elements of the respective control systems.

The present disclosure suppresses the simultaneous occurrence of an abnormality in respective constituent elements of control systems.

An aspect of the present disclosure provides a control device for a steering mechanism. The steering mechanism includes a motor that includes a plurality of coils, the plurality of coils including a first coil and a second coil. The control device includes a first control system and a second control system configured to compute a command value for torque of the motor to be applied to the steering mechanism. The first control system and the second control system are each configured to control power supply to the plurality of coils of the motor based on the command value. The first control system is configured to control power supply to the first coil based on a first command value that is the command value for the torque to be generated by the first coil. The second control system is configured to control power supply to the second coil based on a second command value that is the command value for the torque to be generated by the second coil. The first control system includes a first microcomputer that has first characteristics, and the second control system includes a second microcomputer that has second characteristics that are different from the first characteristics.

With the above configuration, the first control system is formed using the first microcomputer that has the first characteristics, and the second control system is formed using the second microcomputer that has the second characteristics that are different from the first characteristics. The simultaneous occurrence of an abnormality in the constituent elements of the respective control systems can be suppressed since the constituent elements of the control systems have different characteristics even if the constituent elements of the control systems have the same configuration, for example.

In the control device, the first microcomputer may be manufactured using a first raw material, and the second microcomputer may be manufactured using a second raw material that is different from the first raw material. With the above configuration, the first control system is formed using a first constituent element manufactured using the first raw material, and the second control system is formed using a second constituent element manufactured using the second raw material that is different from the first raw material. The simultaneous occurrence of an abnormality in the constituent elements of the respective control systems can be suppressed since the constituent elements of the control systems are manufactured from different raw materials even if the constituent elements of the control systems have the same configuration, for example.

In the control device, the first microcomputer may be manufactured in a first factory, and the second microcomputer may be manufactured in a second factory that is different from the first factory. With the above configuration, the first control system is formed using the first microcomputer that is manufactured in the first factory, and the second control system is formed using the second microcomputer that is manufactured in the second factory that is different from the first factory. The simultaneous occurrence of an abnormality in the constituent elements of the respective control systems can be suppressed since the constituent elements of the control systems are manufactured in different factories even if the constituent elements of the control systems have the same configuration, for example.

In the control device, the first microcomputer may be manufactured by a first manufacturing device, and the second microcomputer may be manufactured by a second manufacturing device that is different from the first manufacturing device.

With the above configuration, the first control system is formed using the first microcomputer that is manufactured by the first manufacturing device, and the second control system is formed using the second microcomputer that is manufactured by the second manufacturing device that is different from the first manufacturing device. The simultaneous occurrence of an abnormality in the constituent elements of the respective control systems can be suppressed since the constituent elements of the control systems are manufactured by different manufacturing devices even if the constituent elements of the control systems have the same configuration, for example.

With the steering control device according to the present disclosure, the simultaneous occurrence of an abnormality in constituent elements of respective control systems can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
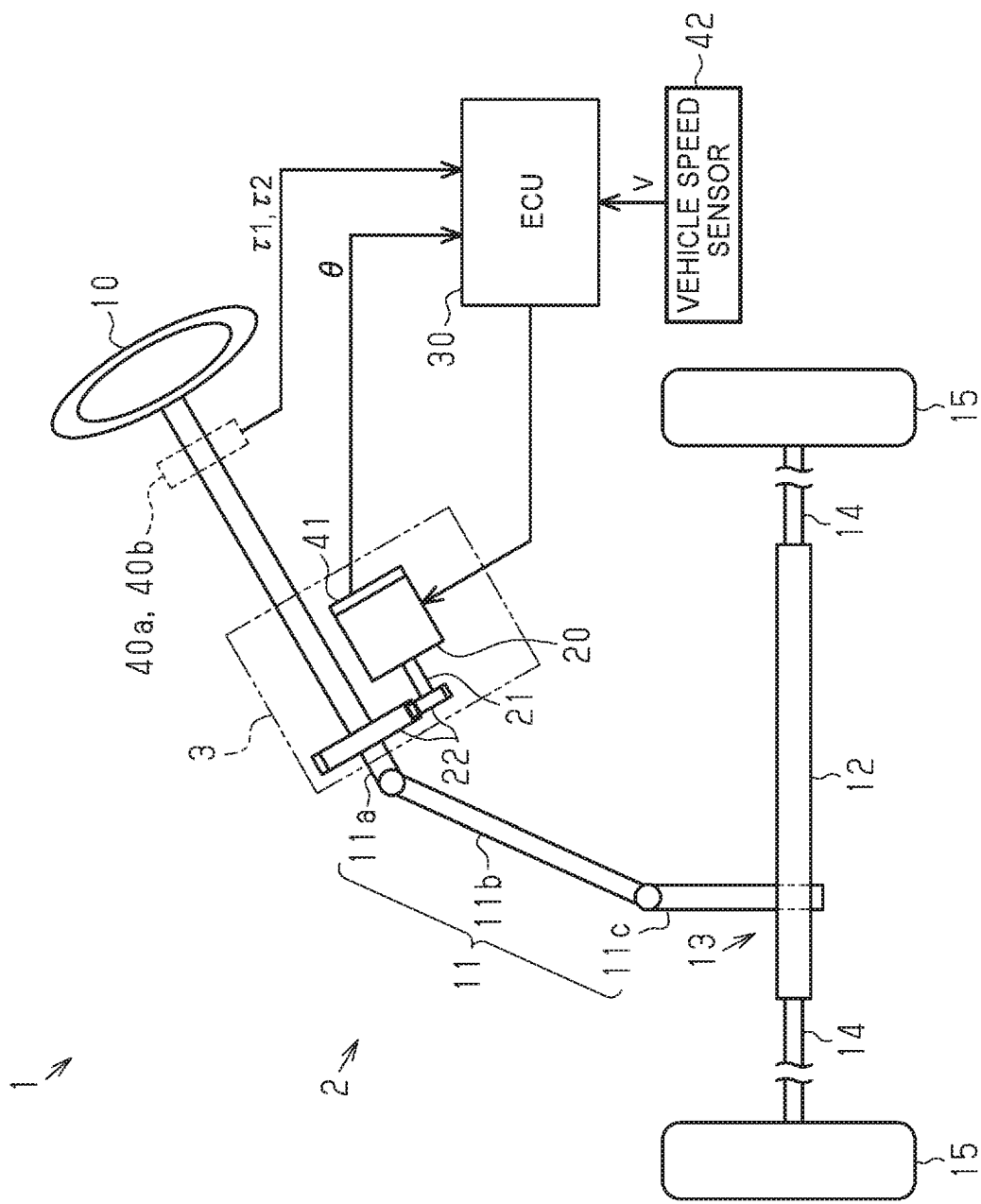
FIG. 1 is a diagram illustrating a schematic configuration of a steering device according to an embodiment that incorporates a steering control device.

An embodiment in which a steering control device is applied to an electric power steering system (referred to as an "EPS") will be described below. As illustrated in FIG. 1, an EPS 1 includes a steering mechanism 2 that steers steered wheels 15 based on an operation of a steering wheel 10 performed by a driver, an assist mechanism 3 that assists the driver in performing a steering operation, and an electronic control unit (ECU) 30 that serves as a steering control device that controls the assist mechanism 3.

The steering mechanism 2 includes the steering wheel 10 that is operated by the driver, and a steering shaft 11 that rotates together with the steering wheel 10. The steering shaft 11 has a column shaft 11a coupled to the steering wheel 10, an intermediate shaft 11b coupled to a lower end portion of the column shaft 11a, and a pinion shaft 11c coupled to a lower end portion of the intermediate shaft 11b. The lower end portion of the pinion shaft 11c is coupled to a rack shaft 12 via a rack-and-pinion mechanism 13. Rotational motion of the steering shaft 11 is converted into reciprocal linear motion of the rack shaft 12 in the axial direction (right-left direction in FIG. 1) via the rack-and-pinion mechanism 13. The reciprocal linear motion of the rack shaft 12 is transferred to the right and left steered wheels 15 via tie rods 14 coupled to respective ends of the rack shaft 12 to vary the steered angle of the steered wheels 15 to change the advancing direction of the vehicle.

The assist mechanism 3 includes a motor 20 that has a rotary shaft 21, and a speed reduction mechanism 22. The motor 20 applies torque to the steering shaft 11. The rotary shaft 21 of the motor 20 is coupled to the column shaft 11a via the speed reduction mechanism 22. The speed reduction mechanism 22 reduces the speed of rotation of the motor 20, and transfers a rotational force at the reduced speed to the column shaft 11a. That is, torque of the motor 20 is applied to the steering shaft 11 to assist the driver in performing a steering operation.

The ECU 30 controls the motor 20 based on the results of detection performed by various sensors provided in the vehicle. Examples of the various sensors include torque sensors 40a and 40b that serve as torque detection devices, a rotational angle sensor 41, and a vehicle speed sensor 42. The torque sensors 40a and 40b are provided to the column shaft 11a. The rotational angle sensor 41 is provided to the motor 20. The torque sensors 40a and 40b detect steering torque τ1 and steering torque τ2 to be applied to the steering shaft 11 along with a steering operation by the driver. The rotational angle sensor 41 detects a rotational angle θ of the rotary shaft 21 of the motor 20. The vehicle speed sensor 42 detects a vehicle speed V that is the travel speed of the vehicle. The ECU 30 sets target torque for the motor 20 to be applied to the steering mechanism 2 based on output values from the sensors, and controls a current to be supplied to the motor 20 such that the actual torque of the motor 20 becomes the target torque.

Figure 2:
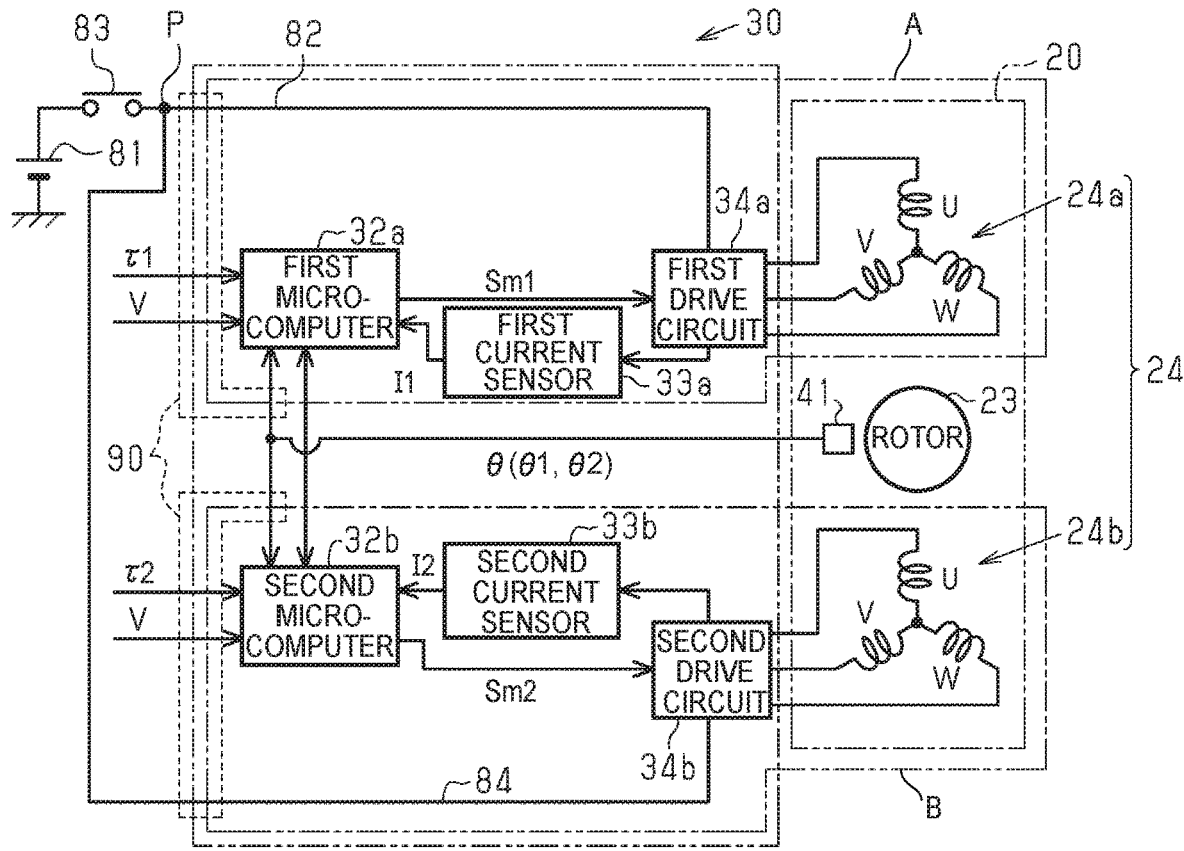
FIG. 2 is a block diagram illustrating a schematic configuration of the steering control device.

Next, the function of the motor 20 will be described in detail with reference to FIG. 2. The motor 20 includes a stator (not illustrated) and a rotor 23. A plurality of permanent magnets are provided inside the rotor 23. The stator includes a plurality of coils 24 wound around a stator core (not illustrated). The coils 24 have a first coil 24a and a second coil 24b. The first coil 24a and the second coil 24b each include coils for U-phase, V-phase, and W-phase connected through a star connection.

Next, the function of the ECU 30 will be described with reference to FIG. 2. The ECU 30 has a control system A that serves as a first control system that controls power supply to the first coil 24a, and a control system B that serves as a second control system that controls power supply to the second coil 24b.

The control system A of the ECU 30 is composed of a first microcomputer 32a, a first current sensor 33a, and a first drive circuit 34a. The control system B of the ECU 30 is composed of a second microcomputer 32b, a second current sensor 33b, and a second drive circuit 34b. The first microcomputer 32a and the second microcomputer 32b have the same configuration. The first current sensor 33a and the second current sensor 33b have the same configuration. The first drive circuit 34a and the second drive circuit 34b have the same configuration. The term "same configuration" as used in relation to the present embodiment refers to having the same function and performance under the same design concept. In the following description, only one of those of the same configuration will be described, and the other will not be described in detail.

The first drive circuit 34a is supplied with power from a direct current (DC) power source 81 such as a battery mounted on the vehicle. The first drive circuit 34a and the DC power source 81 (particularly, a plus terminal thereof) are connected to each other through a first power supply line 82. The first power supply line 82 is provided with a power source switch 83 for the vehicle such as an ignition switch. The power source switch 83 is switched on and off by the driver operating a switch provided to the vehicle. While the power source switch 83 is turned on, power from the DC power source 81 is supplied to the first drive circuit 34a via the first power supply line 82.

The second drive circuit 34b is supplied with power from the DC power source 81. A point of connection P is provided in the first power supply line 82 between the power source switch 83 and the ECU 30. The point of connection P and the second drive circuit 34b are connected to each other through a second power supply line 84. While the power source switch 83 is turned on, power from the DC power source 81 is supplied to the second drive circuit 34b via the second power supply line 84.

The first microcomputer 32a, the rotational angle sensor 41, the first current sensor 33a, the second microcomputer 32b, and the second current sensor 33b are supplied with power from the DC power source 81 via a power supply line (not illustrated). As illustrated in FIGS. 1 and 2, a plurality of connectors 90 are provided between the torque sensors 40a and 40b and the ECU 30, between the rotational angle sensor 41 and the ECU 30, between the vehicle speed sensor 42 and the ECU 30, and between the point of connection P and the ECU 30. The connectors 90 have a function of electrically connecting the torque sensors 40a and 40b, the rotational angle sensor 41, the vehicle speed sensor 42, and the point of connection P to the ECU 30.

The first drive circuit 34a is a drive circuit for three phases (U-phase, V-phase, and W-phase). The first drive circuit 34a converts DC power supplied from the DC power source 81 into 3-phase alternating current (AC) power by turning on and off switching elements that constitute the first drive circuit 34a based on a control signal Sm1 generated by the first microcomputer 32a at the timing of control operation. The first drive circuit 34a supplies 3-phase AC power to the first coil 24a.

The first microcomputer 32a generates the control signal Sm1 (power width modulation (PWM) signal) in each control cycle based on the steering torque $\tau 1$ that is detected by the torque sensor 40a, the rotational angle $\theta$ (first rotational angle $\theta 1$) that is detected by the rotational angle sensor 41, the vehicle speed V that is detected by the vehicle speed sensor 42, and a current value I1 that is detected by the first current sensor 33a. The first current sensor 33a detects a current for each phase (U-phase, V-phase, and W-phase) that flows through a power supply path between the first drive circuit 34a and the first coil 24a.

The second microcomputer 32b generates a control signal Sm2 (PWM signal) at the timing of control operation based on the steering torque $\tau 2$ that is detected by the torque sensor 40b, the rotational angle $\theta$ (second rotational angle $\theta 2$) that is detected by the rotational angle sensor 41, the vehicle speed V that is detected by the vehicle speed sensor 42, and a current value I2 that is detected by the second current sensor 33b. The first rotational angle $\theta 1$ retained by the first microcomputer 32a and the second rotational angle $\theta 2$ retained by the second microcomputer 32b are detected by the same rotational angle sensor 41, and therefore normally have the same value. The second current sensor 33b detects a current for each phase that flows through a power supply path between the second drive circuit 34b and the second coil 24b.

The second drive circuit 34b converts DC power supplied from the DC power source 81 into 3-phase AC power by turning on and off switching elements that constitute the second drive circuit 34b based on the control signal Sm2 that is generated by the second microcomputer 32b at the timing of control operation. The second drive circuit 34b supplies 3-phase AC power to the second coil 24b.

In this way, the first microcomputer 32a and the second microcomputer 32b control power supply to the first coil 24a of the control system A and the second coil 24b of the control system B through control on the first drive circuit 34a and the second drive circuit 34b.

Figure 3:
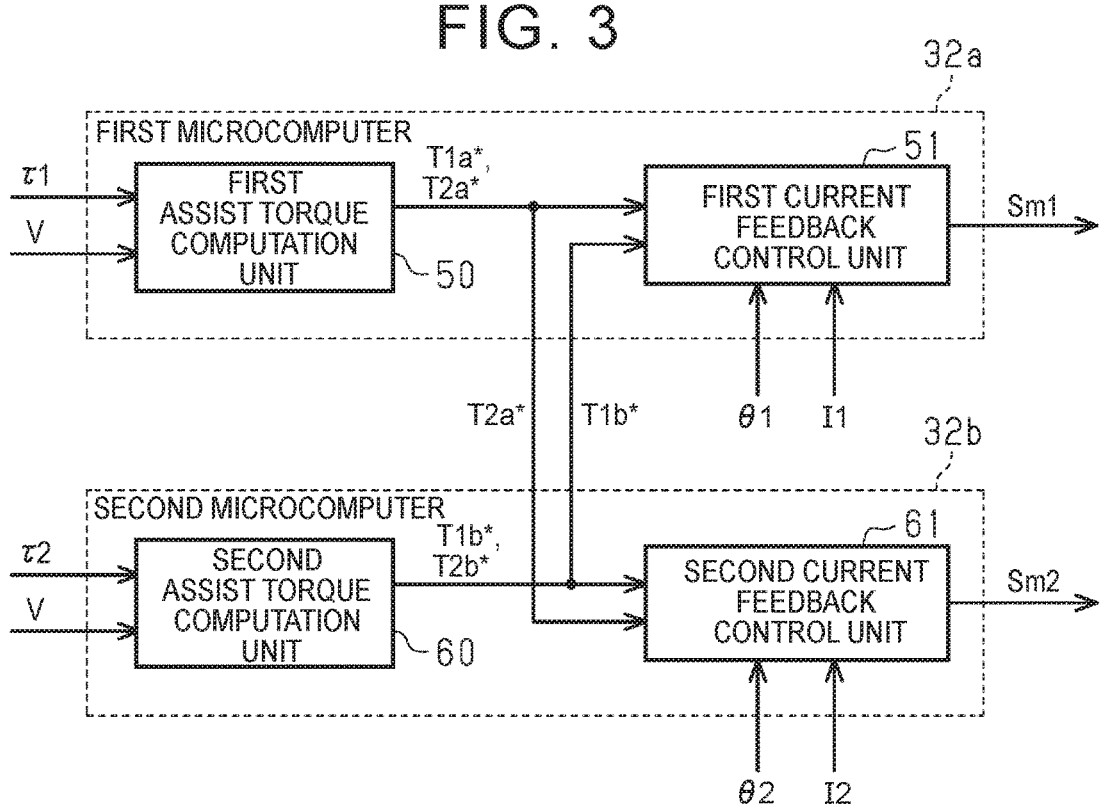
FIG. 3 is a block diagram illustrating a schematic configuration of a first microcomputer and a second microcomputer.

Next, the function of the first microcomputer 32a and the second microcomputer 32b will be described in detail with reference to FIG. 3. The first microcomputer 32a includes a first assist torque computation unit 50 and a first current feedback control unit 51. The second microcomputer 32b includes a second assist torque computation unit 60 and a second current feedback control unit 61.

The first assist torque computation unit 50 computes a first command value T1a* and a second command value T2a* based on the steering torque $\tau 1$ that is detected by the torque sensor 40a and the vehicle speed V that is detected by the vehicle speed sensor 42. The first command value T1a* is a command value for torque that should be generated by the first coil 24a of the control system A. The second command value T2a* is a command value for torque that should be generated by the second coil 24b of the control system B. The first assist torque computation unit 50 outputs the first command value T1a* to the first current feedback control unit 51, and outputs the second command value T2a* to the second microcomputer 32b, that is, the second current feedback control unit 61, through inter-microcomputer communication.

The second assist torque computation unit 60 computes a first command value T1b* and a second command value T2b* based on the steering torque $\tau 2$ that is detected by the torque sensor 40b and the vehicle speed V that is detected by the vehicle speed sensor 42. The first command value T1b* is a command value for torque that should be generated by the first coil 24a of the control system A. The second command value T2b* is a command value for torque that should be generated by the second coil 24b of the control system B. The second assist torque computation unit 60 outputs the first command value T1b* to the first microcomputer 32a, that is, the first current feedback control unit 51, through inter-microcomputer communication, and outputs the second command value T2b* to the second current feedback control unit 61.

Control in which the first command values T1a* and T1b* and the second command values T2a* and T2b* are set to different values is referred to as "unbalanced control". Control in which the first command values T1a* and T1b* and the second command values T2a* and T2b* are set to equal values is referred to as "parallel control". In the present embodiment, the first assist torque computation unit 50 and the second assist torque computation unit 60 always execute parallel control.

The first current feedback control unit 51 retrieves not only the first command value T1a* and the first command value T1b* but also the first rotational angle $\theta 1$ and the current value I1. The first current feedback control unit 51 executes computation of the control signal Sm1 using one of the first command value T1a* and the first command value T1b*. In the case where the torque sensor 40a is normal, the first current feedback control unit 51 executes computation of the control signal Sm1 using the first command value T1a* that is computed by the first assist torque computation unit 50. In the case where it is determined by a fail-safe process etc. that the torque sensor 40a is not normal, in contrast, the first current feedback control unit 51 computes the control signal Sm1 using the first command value T1b* that is computed by the second assist torque computation unit 60.

In the case where the torque sensor 40b is normal, the second current feedback control unit 61 executes computation of the control signal Sm2 using the second command value T2a* that is computed by the first assist torque computation unit 50. In the case where it is determined by a fail-safe process etc. that the torque sensor 40b is not normal, in contrast, the second current feedback control unit 61 executes computation of the control signal Sm2 using the second command value T2b* that is computed by the second assist torque computation unit 60. In the case where the torque sensor 40a is normal, the first microcomputer 32a operates as a so-called master, and the second microcomputer 32b operates as a so-called slave. In the case where the torque sensor 40a is abnormal and the torque sensor 40b is normal, meanwhile, the first microcomputer 32a operates as the slave, and the second microcomputer 32b operates as the master.

The first current feedback control unit 51 retrieves not only the first command value T1a* and the first command value T1b* but also the first rotational angle θ1 and the current value I1. The first current feedback control unit 51 executes computation of the control signal Sm1 using one of the first command value T1a* and the first command value T1b*. The first current feedback control unit 51 computes the control signal Sm1 based on the first command value T1a* (or the first command value T1b*), the first rotational angle θ1, and the current value I1. Specifically, the first current feedback control unit 51 computes the control signal Sm1 by executing current feedback control based on the deviation between a current command value corresponding to the first command value T1a* (or the first command value T1b*) and the current value I1 such that the current value I1 follows the current command value.

The second current feedback control unit 61 retrieves not only the second command value T2a* and the second command value T2b* but also the second rotational angle θ2 and the current value I2. The second current feedback control unit 61 executes computation of the control signal Sm2 using one of the second command value T2a* and the second command value T2b*. The second current feedback control unit 61 computes the control signal Sm2 based on the second command value T2a* (or the second command value T2b*), the second rotational angle θ2, and the current value I2. More specifically, the second current feedback control unit 61 computes the control signal Sm2 by executing current feedback control based on the deviation between a current command value corresponding to the second command value T2a* (or the second command value T2b*) and the current value I2 such that the current value I2 follows the current command value.

Figure 4:
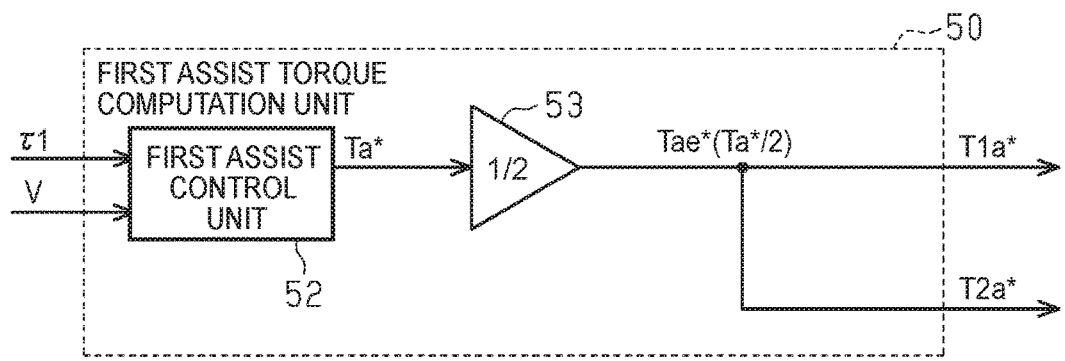
FIG. 4 is a block diagram illustrating a schematic configuration of a first assist torque computation unit.

Next, the function of the first assist torque computation unit 50 will be described in detail with reference to FIG. 4. The first assist torque computation unit 50 includes a first assist control unit 52 and an equal distribution unit 53. The second assist torque computation unit 60 also has constituent elements that are similar to those of the first assist torque computation unit 50.

Figure 5:
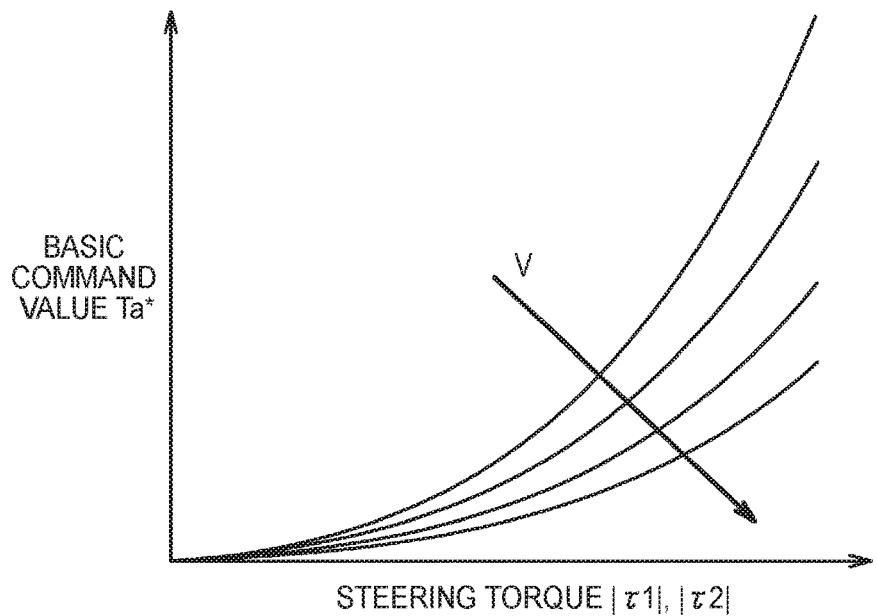
FIG. 5 is a graph indicating the relationship between a basic command value and steering torque.

The first assist control unit 52 computes a basic command value Ta*, which is the sum of the first command value T1a* and the second command value T2a*, based on the steering torque τ1 and the vehicle speed V. Specifically, as indicated in FIG. 5, the first assist control unit 52 computes the basic command value Ta* that has a larger absolute value as the absolute value of the input steering torque τ1 is larger or as the vehicle speed V is lower. The ratio (|ΔTa*/Δτ1|) of the amount of variation |ΔTa*| in the absolute value of the basic command value Ta* to the amount of variation |Δτ1| in the absolute value of the steering torque τ1 is higher as the absolute value of the steering torque τ1 is larger. Whether the steering torque τ1 is positive or negative is determined based on whether the steering wheel 10 is steered rightward or steered leftward. The basic command value Ta* that is computed by the first assist control unit 52 also has a positive or negative sign, depending on whether the sign of the steering torque τ1 is positive or negative.

The equal distribution unit 53 multiplies the input basic command value Ta* by "½". That is, the equal distribution unit 53 computes an equal command value Tae* ("Ta*/2") obtained by equally dividing the basic command value Ta*. The equal command value Tae* that is computed by the equal distribution unit 53 is output, as it is, as the first command value T1a* and the second command value T2a*. In short, the first command value T1a* and the second command value T2a* that are computed by the equal distribution unit 53 are set to equal values.

The equal command value Tae* becomes larger as the absolute values of the steering torque τ1 and the steering torque τ2 become larger. The relationship between the equal command value Tae* and the absolute values of the steering torque τ1 and the steering torque τ2 is the same as the relationship that is indicated by curves with half the slope of the relationship between the basic command value Ta* and the absolute values of the steering torque τ1 and the steering torque τ2 indicated in FIG. 5 on condition that the vehicle speed V is the same. Therefore, the slope of the equal command value Tae* with respect to the steering torque τ1 and the steering torque τ2 becomes larger as the absolute values of the steering torque τ1 and the steering torque τ2 become larger.

Figure 6:
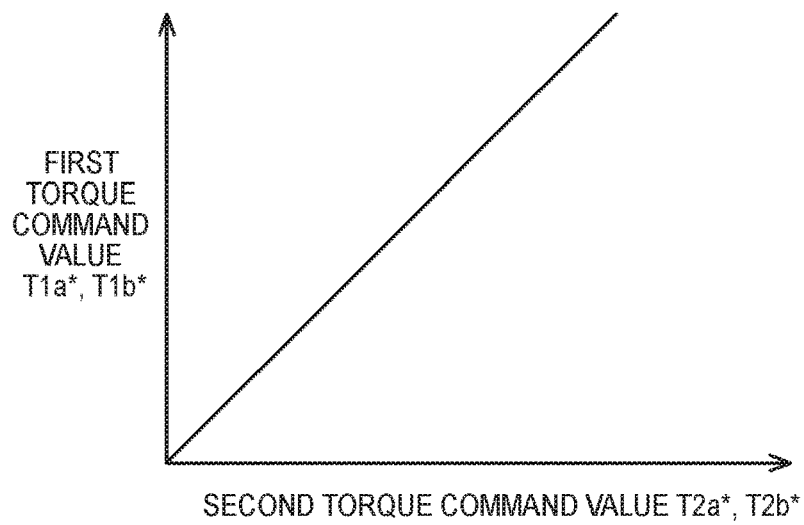
FIG. 6 is a graph illustrating the relationship between an assist amount for a control system A and an assist amount for a control system B.

In FIG. 6, the second command values T2a* and T2b* are plotted on the horizontal axis, and the first command values T1a* and T1b* are plotted on the vertical axis. FIG. 6 indicates the relationship for a case where the first command values T1a* and T1b* and the second current command values T2a* and T2b* are the same.

In the present embodiment, the first microcomputer 32a, which is a constituent element of the control system A, and the second microcomputer 32b, which is a constituent element of the control system B, are manufactured so as to have different characteristics in spite of having the same computation performance related to the computation processing function such as the computation processing speed. The term "characteristics" as used in the present embodiment refers to the durability such as the life and the failure rate related to the ratio of components of materials, the content of internal particles (particulate foreign matter, impurities, or contaminants), the factory of manufacture, the manufacturing device that is a facility of the factory of manufacture, the temperature-voltage performance that is the test results of a temperature-voltage test, the environmental load performance that is the test results of an environmental load test, etc.

Specifically, the first microcomputer 32a, which is a constituent element of the control system A, and the second microcomputer 32b, which is a constituent element of the control system B, are manufactured from different raw materials (ingots). More particularly, the first microcomputer 32a and the second microcomputer 32b are manufactured in different factories so that a first ingot used to manufacture the first microcomputer 32a and a second ingot used to manufacture the second microcomputer 32b are different from each other. If the fact that the first microcomputer 32a and the second microcomputer 32b are manufactured in different factories is put in other words, the first microcomputer 32a and the second microcomputer 32b are manufactured in different manufacturing lines.

The first microcomputer 32a and the second microcomputer 32b are manufactured in different factories so that a first manufacturing device that manufactures the first microcomputer 32a and a second manufacturing device that manufactures the second microcomputer 32b are different from each other. For example, a first manufacturing device that is a facility of a first factory Fa used in a pre-processing step of the first factory Fa and a second manufacturing device that is a facility of a second factory Fb used in a pre-processing step of the second factory Fb are different from each other. The manufacturing devices that are used in the pre-processing steps may be a variety of manufacturing devices such as a manufacturing device that forms a wafer from an ingot, a manufacturing device that polishes a surface of the wafer, a manufacturing device that forms a film on the surface of the wafer, and a manufacturing device that performs etching. A first manufacturing device that is a facility of the first factory Fa used in a post-processing step of the first factory Fa and a second manufacturing device that is a facility of the second factory Fb used in a post-processing step of the second factory Fb are different from each other. The manufacturing devices that are used in the post-processing steps may be a manufacturing device that mounts an electronic component on the wafer that has been subjected to the pre-processing step, a manufacturing device that solders the electronic component that has been mounted, a manufacturing device that molds a resin around the electronic component that has been mounted, and a test device and a measurement device that execute the temperature-voltage test and the environmental load test. In this way, the first microcomputer 32a and the second microcomputer 32b are manufactured in the first factory Fa and the second factory Fb, respectively, which are different from each other so that a first manufacturing device that manufactures the first microcomputer 32a and a second manufacturing device that manufactures the second microcomputer 32b can be different from each other. The first microcomputer 32a is an example of a first constituent element defined, and the second microcomputer 32b is an example of a second constituent element.

In the case where power supply to the first coil 24a or the second coil 24b cannot be continued with an abnormality caused in one of the first microcomputer 32a of the control system A and the second microcomputer 32b of the control system B, a control system that can continue power supply to the first coil 24a or the second coil 24b can generate torque of the motor 20. In this case, the control system that can continue power supply to the first coil 24a or the second coil 24b can generate torque up to half the maximum torque of the motor 20, for example, and assist can be continued based on such torque.

Figure 7:
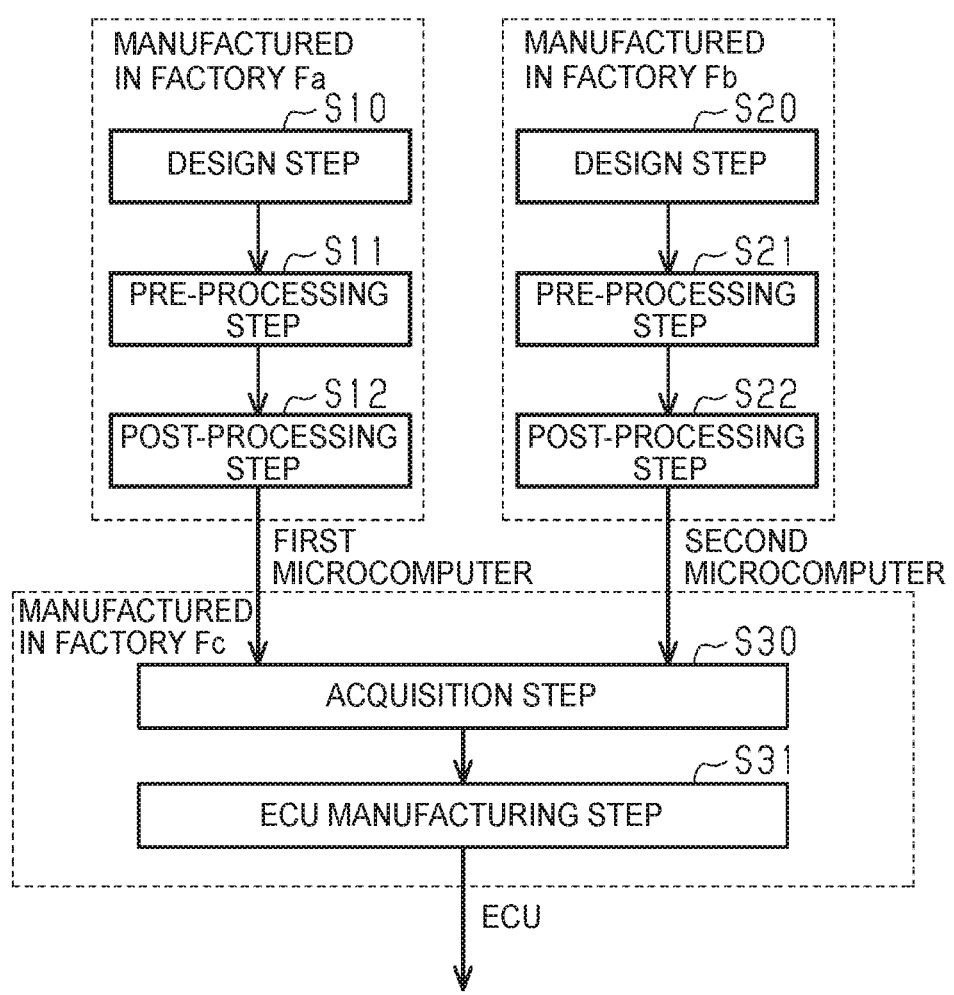
FIG. 7 is a flowchart illustrating the procedure of a manufacturing process for the steering control device.

A manufacturing step for the ECU 30 will be described with reference to FIG. 7. A design step in which the function and the performance of the first microcomputer 32a are set and a circuit that implements the function and the performance is designed is performed in the first factory Fa (step S10). After step S10 is finished, a pre-processing step in which a wafer formed from a first ingot is processed is performed (step S11). In the pre-processing step, a wafer is formed, a surface of the wafer is polished, an insulating film or a conductive film is formed on the surface of the wafer, and etching is performed, etc. After step S11 is finished, a post-processing step in which an electronic component is mounted on the wafer that has been subjected to the pre-processing step to assemble an integrated circuit (IC), that is, the first microcomputer 32a, is performed (step S12). In the post-processing step, an electronic component is mounted on the wafer that has been subjected to the pre-processing step, the electronic component that has been mounted is soldered, a resin is molded around the electronic component that has been mounted, a temperature-voltage test and an environmental load test are executed on the IC, and the reliability of the IC that has been manufactured is inspected, etc.

Such steps S10 to S12 are executed in the first factory Fa, and the first microcomputer 32a is manufactured in the first factory Fa. A design step in which the function and the performance of the second microcomputer 32b are set and a circuit that implements the function and the performance is designed is performed in the second factory Fb (step S20). After step S20 is finished, a pre-processing step in which a wafer formed from the second ingot is processed is performed (step S21). After step S21 is finished, a post-processing step in which an electronic component is mounted on the wafer that has been subjected to the pre-processing step to assemble an IC is performed (step S22).

Such steps S20 to S22 are executed in the second factory Fb that is different from the first factory Fa, and the second microcomputer 32b is manufactured in the second factory Fb. An acquisition step in which the first microcomputer 32a, which is manufactured in the first factory Fa, and the second microcomputer 32b, which is manufactured in the second factory Fb, are acquired is performed in a third factory Fc (step S30). Next, an ECU 30 is manufactured using the first microcomputer 32a, which is manufactured in the first factory Fa and acquired in the acquisition step, and the second microcomputer 32b, which is manufactured in the second factory Fb and acquired in the acquisition step (step S31). The acquisition step in step S30 and the manufacturing step for the ECU 30 in step S31 are executed in the third factory Fc that is different from the first factory Fa and the second factory Fb. The third factory Fc is managed such that the control system A can be formed by mounting the first microcomputer 32a that is acquired in the acquisition step and the control system B can be formed by mounting the second microcomputer 32b that is acquired in the acquisition step. In the third factory Fc, in the manufacturing step, the first microcomputer 32a that is manufactured by the first manufacturing device in the first factory Fa using the first ingot is mounted in the control system A, and the second microcomputer 32b that is manufactured by the second manufacturing device in the second factory Fb using the second ingot is mounted in the control system B. Consequently, the ECU 30 is manufactured in the manufacturing step such that the first microcomputer 32a of the control system A and the second microcomputer 32b of the control system B have different characteristics.

The functions and the effects of the present embodiment will be described. In the case where the first microcomputer 32a of the control system A and the second microcomputer 32b of the control system B are used under the same control load, an abnormality may be caused in the constituent elements of the respective control systems because of the same factor when the ingot for the first microcomputer 32a of the control system A and the ingot for the second microcomputer 32b of the control system B are the same as each other. In this case, an abnormality may be caused simultaneously in the same components of the respective control systems.

For example, in the case where the first microcomputer 32a of the control system A and the second microcomputer 32b of the control system B are manufactured using the same ingot, it is considered that the ratio of components of materials is the same, and therefore the characteristics of the two microcomputers related to the ratio of components of materials are occasionally the same as each other. Therefore, it is considered that the two microcomputers are degraded over time at about the same degradation rate if the two microcomputers are used under the same control load, and therefore it is assumed that an abnormality is caused simultaneously in the two microcomputers.

In the present embodiment, different ingots are used for the first microcomputer 32a and the second microcomputer 32b while parallel control is performed with the same control load on the control system A and the control system B. In this case, the ratio of components of materials that constitute the microcomputers of the respective control systems depends on the ingots that are used for forming. Thus, the characteristics of the first microcomputer 32a and the second microcomputer 32b can be different from each other. Therefore, the simultaneous occurrence of an abnormality in the first microcomputer 32a and the second microcomputer 32b can be suppressed even if the first microcomputer 32a and the second microcomputer 32b have the same computation performance.

The first microcomputer 32a that is manufactured in the first factory Fa is used for the control system A, and the second microcomputer 32b that is manufactured in the second factory Fb is used for the control system B. The content of particles inside each microcomputer depends on the manufacturing environment such as the manufacturing line. Thus, the characteristics of the first microcomputer 32a and the second microcomputer 32b can be different from each other. Therefore, the simultaneous occurrence of an abnormality in the first microcomputer 32a and the second microcomputer 32b can be suppressed even if the microcomputers of the respective control systems have the same computation performance.

The first microcomputer 32a that is manufactured by the first manufacturing device is used for the control system A, and the second microcomputer 32b that is manufactured by the second manufacturing device is used for the control system B. The temperature-voltage performance, the environmental load performance, etc. of each microcomputer depends on the manufacturing device such as a test device and a measurement device used to measure and test such performances. Thus, the characteristics of the first microcomputer 32a and the second microcomputer 32b can be different from each other. Therefore, the simultaneous occurrence of an abnormality in the first microcomputer 32a and the second microcomputer 32b can be suppressed even if the microcomputers of the respective control systems have the same computation performance.

By combining, in the acquisition step, the first microcomputer 32a and the second microcomputer 32b that are constituent elements of the ECU 30 and are manufactured from different ingots, the ECU 30 can be manufactured in the manufacturing step such that the characteristics of the first microcomputer 32a and the second microcomputer 32b are different from each other.

By combining, in the acquisition step, the first microcomputer 32a and the second microcomputer 32b that are constituent elements of the ECU 30 and manufactured in different factories, the ECU 30 can be manufactured in the manufacturing step such that the characteristics of the first microcomputer 32a and the second microcomputer 32b are different from each other.

By combining, in the acquisition step, the first microcomputer 32a and the second microcomputer 32b that are constituent elements of the ECU 30 and manufactured by different manufacturing devices such as test devices and measurement devices, the ECU 30 can be manufactured in the manufacturing step such that the characteristics of the first microcomputer 32a and the second microcomputer 32b are different from each other.

The present embodiment may be modified as follows. The following other embodiments may be combined with each other as long as the embodiments do not technically contradict with each other. While two control systems, namely the control system A and the control system B, are provided in the present embodiment, three or more control systems may be provided. For example, the motor 20 may have three coils in the case where there are three or more control systems. In this case, the microcomputers of the respective control systems may perform parallel control on power supply such that the coils share generation of the maximum torque of the motor 20.

The first current feedback control unit 51 may execute computation of the control signal Sm1 using the average value of the first command value T1a* and the first command value T1b* in the case where the difference between the first command value T1a* and the first command value T1b* is less than a predetermined value. This also applies to the second current feedback control unit 61.

The present embodiment may be applied to a mechatronic motor device in which the motor 20 and the ECU 30 are configured integrally with each other. The rotational angle sensor 41 may include an MR sensor, a Hall sensor, or a resolver.

The first rotational angle θ1 retained by the first microcomputer 32a and the second rotational angle θ2 retained by the second microcomputer 32b are detected by the same rotational angle sensor 41. However, the present disclosure is not limited thereto. For example, the first rotational angle θ1 to be retained by the first microcomputer 32a may be detected by a first rotational angle sensor, and the second rotational angle θ2 to be grasped by the second microcomputer 32b may be detected by a second rotational angle sensor that is different from the first rotational angle sensor.

In the present embodiment, the first assist torque computation unit 50 and the second assist torque computation unit 60 always execute parallel control. However, the present disclosure is not limited thereto. For example, the first assist torque computation unit 50 and the second assist torque computation unit 60 may always execute unbalanced control in which the first command values T1a* and T1b* and the second command values T2a* and T2b* are set to different values. Alternatively, the first assist torque computation unit 50 and the second assist torque computation unit 60 may execute unbalanced control in the case where the steering torque τ1 and the steering torque τ2 are equal to or less than a threshold, and execute parallel control in the case where the steering torque τ1 and the steering torque τ2 exceed the threshold.

While the first assist control unit 52 computes the basic command value Ta* based on the steering torque τ1 and the vehicle speed V, the first assist control unit 52 may compute the basic command value Ta* based on only the steering torque τ1. It is also possible in the present embodiment to separately provide an external ECU that computes a command value on which a command value for torque that should be generated by the motor 20 is based, and that outputs (provides) the command value to the ECU 30.

In the present embodiment, the first microcomputer 32a and the second microcomputer 32b are manufactured in different factories in order that the first microcomputer 32a and the second microcomputer 32b are manufactured using different ingots. However, the present disclosure is not limited thereto. For example, the first microcomputer 32a and the second microcomputer 32b may be manufactured in the same factory in different manufacturing lines. In this case, the first manufacturing device that manufactures the first microcomputer 32a and the second manufacturing device that manufactures the second microcomputer 32b may be different from each other since the manufacturing lines are different from each other. Alternatively, for example, the first microcomputer 32a and the second microcomputer 32b may be manufactured in the same manufacturing line in the same factory using the first ingot that is used to manufacture the first microcomputer 32a and the second ingot that is used to manufacture the second microcomputer 32b, respectively, which are different from each other. Also in this case, the ECU 30 can be manufactured in the manufacturing step with the first microcomputer 32a and the second microcomputer 32b manufactured using different ingots, in different factories, or by different manufacturing devices.

In the present embodiment, the first microcomputer 32a and the second microcomputer 32b are manufactured in the first factory Fa and the second factory Fb, respectively, which are different from each other. However, the present disclosure is not limited thereto. For example, a component that constitutes the first microcomputer 32a and a component that constitutes the second microcomputer 32b may be manufactured in different factories. In this case, in the factory in which the ECU 30 is to be manufactured, the ECU 30 is manufactured after the first microcomputer 32a and the second microcomputer 32b are assembled from such components. Alternatively, the first drive circuit 34a and the second drive circuit 34b may be manufactured in different factories. Alternatively, the first current sensor 33a and the second current sensor 33b may be manufactured in different factories. In the case where the control system A and the control system B are provided with an oscillator, the oscillator of the control system A and the oscillator of the control system B may be manufactured in different factories.

The first microcomputer 32a is manufactured in the first factory Fa, the second microcomputer 32b is manufactured in the second factory Fb, and the ECU 30 is manufactured in the third factory Fc. However, the present disclosure is not limited thereto. The first microcomputer 32a and the ECU 30 may be manufactured in the same factory, and the second microcomputer 32b may be manufactured in a different factory. Alternatively, the second microcomputer 32b and the ECU 30 may be manufactured in the same factory, and the first microcomputer 32a may be manufactured in a different factory. Alternatively, the first microcomputer 32a, the second microcomputer 32b, and the ECU 30 may be manufactured in the same factory. In this case, it is only necessary that the first microcomputer 32a and the second microcomputer 32b should be manufactured in different manufacturing lines as described above.

The first factory Fa, the second factory Fb, and the third factory Fc may be of different manufacturing companies, or may be of the same manufacturing company. In the case where all the factories are of the same manufacturing company, the first microcomputer 32a and the second microcomputer 32b can be manufactured using different ingots or by different manufacturing devices since the first factory Fa and the second factory Fb are different factories, although the first factory Fa and the second factory Fb are of the same manufacturing company. Besides, the first factory Fa and the second factory Fb may be of the same manufacturing company, and the third factory Fc may be of a different manufacturing company. Alternatively, the first factory Fa and the third factory Fc may be of the same manufacturing company, and the second factory Fb may be of a different manufacturing company. Alternatively, the second factory Fb and the third factory Fc may be of the same manufacturing company, and the first factory Fa may be of a different manufacturing company.

In the present embodiment, the first assist torque computation unit 50 may compute only the first command value T1a*, and the second assist torque computation unit 60 may compute only the second command value T2b*. That is, the first microcomputer 32a and the second microcomputer 32b may control power supply to the first coil 24a and the second coil 24b independently of each other.

In the present embodiment, the connector 90 of the control system A and the connector 90 of the control system B may be manufactured in different factories. Alternatively, the connector 90 of the control system A and the connector 90 of the control system B may be manufactured in the same factory in different manufacturing lines. Alternatively, the connector 90 of the control system A and the connector 90 of the control system B may be manufactured by different manufacturing companies. In such manners, the connectors 90 can be manufactured using different ingots, in different factories, or by different manufacturing devices.

In the present embodiment, the steering device is embodied as the EPS 1 in which an assist force is applied to the steering shaft 11 by the motor 20. However, the present disclosure is not limited thereto. For example, the steering device may be embodied as the EPS 1 in which an assist force is applied to the rack shaft 12 by the motor 20 that has the rotary shaft 21 disposed in parallel with the rack shaft 12. Alternatively, the steering device may be embodied as a steer-by-wire device. That is, the steering device may be any device in which power is applied to the steering mechanism 2 by the motor 20.

What is claimed is:

1. A control device for a steering mechanism,
the steering mechanism including a motor that includes a plurality of coils, the plurality of coils including a first coil and a second coil,
the control device comprising a first control system and a second control system configured to compute a command value for torque of the motor to be applied to the steering mechanism, the first control system and the second control system being each configured to control power supply to the plurality of coils of the motor based on the command value,
the first control system being configured to control power supply to the first coil based on a first command value that is the command value for the torque to be generated by the first coil,
the second control system being configured to control power supply to the second coil based on a second command value that is the command value for the torque to be generated by the second coil,
the first control system including a first microcomputer that has first characteristics, and the second control system including a second microcomputer that has second characteristics that are different from the first characteristics in spite of the second microcomputer having a same computation performance as the first microcomputer,
each of the first microcomputer and the second microcomputer computing a respective first command value,
each of the first microcomputer and the second microcomputer computing a respective second command value,
the first microcomputer and the second microcomputer executing parallel control, the parallel control being a control in which the first command values and the second command values are set to equal values,
the first microcomputer is configured to compute the first command value and the second command value based on steering torque that is detected by a first torque sensor, and the second microcomputer is configured to compute the first command value and the second command value based on steering torque that is detected by a second torque sensor,
the first command value of the first microcomputer is a command value for torque that is generated by the first coil and the second command value of the first microcomputer is a command value for torque that is generated by the second coil, the second command value being input to the second microcomputer through inter-microcomputer communication, and the first command value of the second microcomputer is a command value for torque that is generated by the first coil and the second command value of the second microcomputer is a command value for torque that is generated by the second coil, the first command value being input to the first microcomputer through inter-microcomputer communication.

2. The control device for the steering mechanism according to claim 1, wherein
the first microcomputer is manufactured using a first raw material, and the second microcomputer is manufactured using a second raw material that is different from the first raw material.

3. The control device for the steering mechanism according to claim 1, wherein
the first microcomputer is manufactured in a first factory, and the second microcomputer is manufactured in a second factory that is different from the first factory.

4. The control device for the steering mechanism according to claim 1, wherein
the first microcomputer is manufactured by a first manufacturing device, and the second microcomputer is manufactured by a second manufacturing device that is different from the first manufacturing device.

* * * * *